(12) United States Patent
Steiner

(10) Patent No.: US 10,198,445 B2
(45) Date of Patent: Feb. 5, 2019

(54) AUTOMATED ARCHIVING OF USER GENERATED MEDIA FILES

(71) Applicant: Google LLC, Mountain View, CA (US)

(72) Inventor: Matthew Steiner, Los Altos, CA (US)

(73) Assignee: Google LLC, Mountain View, CA (US)

(*) Notice: Subject to any disclaimer, the term of this patent is extended or adjusted under 35 U.S.C. 154(b) by 213 days.

(21) Appl. No.: 14/466,942

(22) Filed: Aug. 22, 2014

(65) Prior Publication Data

US 2015/0379020 A1 Dec. 31, 2015

Related U.S. Application Data

(60) Provisional application No. 62/019,358, filed on Jun. 30, 2014.

(51) Int. Cl.
*G06F 17/30* (2006.01)

(52) U.S. Cl.
CPC .. *G06F 17/30073* (2013.01); *G06F 17/30115* (2013.01)

(58) Field of Classification Search
CPC .................................................. G06F 17/30073
USPC ................................ 707/668, 610, 665, 640
See application file for complete search history.

(56) References Cited

U.S. PATENT DOCUMENTS

| | | | | |
|---|---|---|---|---|
| 2003/0079038 A1* | 4/2003 | Robbin | ................ | G06F 1/1613 709/232 |
| 2004/0267825 A1* | 12/2004 | Novak | .............. | G06F 17/30578 |
| 2006/0190549 A1* | 8/2006 | Teramae | ........... | G06F 17/30067 709/208 |
| 2007/0073937 A1 | 3/2007 | Feinberg et al. | | |
| 2007/0146790 A1* | 6/2007 | Park | .................. | G06F 17/30265 358/1.16 |
| 2010/0107104 A1* | 4/2010 | Bruce | ............... | G06F 17/30174 715/772 |
| 2011/0137855 A1 | 6/2011 | Shustef | | |

(Continued)

FOREIGN PATENT DOCUMENTS

| | | |
|---|---|---|
| JP | 2013-521588 A | 6/2013 |
| JP | 2013-131107 A | 7/2013 |

(Continued)

OTHER PUBLICATIONS

International Preliminary Report on Patentability dated Jan. 3, 2017, which issued in International Application No. PCT/US2015/037016.

(Continued)

*Primary Examiner* — Thu Nguyet T Le
(74) *Attorney, Agent, or Firm* — Lerner, David, Littenberg, Krumholz & Mentlik, LLP

(57) ABSTRACT

Aspects of the subject technology relate to archiving user generated content. A data storage device of a computer system is scanned for media files, and directories of the data storage device containing media files found during the scan are added to an upload directory list. For each directory in the upload directory list, respective identifiers for the media files contained in the directory are determined and sent to a server. Confirmation is received from the server of whether the sent identifiers match identifiers for media files already stored by the server. The media files having identifiers confirmed as not matching identifiers for media files already stored by the server are uploaded.

20 Claims, 4 Drawing Sheets

(56) References Cited

U.S. PATENT DOCUMENTS

| | | | |
|---|---|---|---|
| 2012/0016838 A1* | 1/2012 | Arai | G06F 3/0611 |
| | | | 707/610 |
| 2012/0095962 A1* | 4/2012 | Goldman | G06F 17/30038 |
| | | | 707/634 |
| 2013/0151816 A1 | 6/2013 | Indukuru et al. | |
| 2013/0318094 A1* | 11/2013 | Agro | G06F 17/30017 |
| | | | 707/741 |
| 2014/0081920 A1* | 3/2014 | Itasaki | G06F 11/1458 |
| | | | 707/654 |
| 2014/0181157 A1 | 6/2014 | Houston et al. | |
| 2015/0089019 A1* | 3/2015 | Chou | G06F 17/30174 |
| | | | 709/217 |

FOREIGN PATENT DOCUMENTS

| | | |
|---|---|---|
| JP | 2013-200630 A | 10/2013 |
| WO | WO-2012/166443 A1 | 12/2012 |

OTHER PUBLICATIONS

Japanese Office Action from Japanese Patent Application No. 2016-570332, dated Dec. 5, 2017, 11 pages.
Extended European Search Report from European Patent Application No. 15815367.6, dated Dec. 6, 2017, 8 pages.
Korean Office Action from Korean Patent Application No. 10-2016-7036593 dated Apr. 12, 2018, 13 pages.

* cited by examiner

AUTOMATED ARCHIVING OF USER
GENERATED MEDIA FILES

CROSS-REFERENCE TO RELATED APPLICATIONS

This application is based upon and claims priority to U.S. Provisional Patent Application 62/019,358, entitled "AUTOMATED ARCHIVING OF USER GENERATED MEDIA FILES," filed Jun. 30, 2014, the entirety of which is incorporated by reference herein.

BACKGROUND

The present disclosure relates generally to archiving files, and more specifically relates to automatically archiving user generated media files.

With digital cameras and other similar devices, people are able to take photos and videos, which are saved as files. When users connect their cameras to their computers, they may not always transfer their media files from the camera. Users also may not be diligent in backing up their content. They may also not know where exactly they have saved their files, or they may misplace a set by saving to a location they have forgotten. When attempting to upload photos or videos, users may not know any or all of the directories storing their content.

SUMMARY

Aspects of the subject technology relate to systems and methods for archiving user generated media files. A non-transitory, computer-readable storage medium containing instructions that cause a computer system executing the instructions to scan a data storage device of the computer system for media files and add a directory of the data storage device containing one or more media files found during the scan to an upload directory list. The instructions further cause the computer system to, for each directory in the upload directory list, determine respective identifiers for the one or more media files contained in the directory, send the determined identifiers to a server, and receive confirmation from the server of whether the sent identifiers match identifiers for media files already stored by the server. The instructions further cause the computer system to upload, to the server, one or more media files having identifiers confirmed as not matching identifiers for media files already stored by the server.

Aspects of the subject technology also relate to a system comprising one or more processors and a non-transitory, computer-readable storage medium comprising instructions stored therein, which when executed by the one or more processors, cause the one or more processors to perform operations. The operations comprise scanning a data storage device of the computer system for media files, and adding a directory of the data storage device containing one or more media files found during the scan to an upload directory list. The operations further comprise, for each directory in the upload directory list, determining respective identifiers for the one or more media files contained in the directory, and sending the determined identifiers to a server. The operations further comprise receiving confirmation from the server of whether the sent identifiers match identifiers for media files already stored by the server, and uploading, to the server, one or more media files having identifiers confirmed as not matching identifiers for media files already stored by the server.

Aspects of the subject technology also relate to a non-transitory, computer-readable storage medium containing instructions that cause a computer system executing the instructions to scan a first data storage device of the computer system for media files, and add a directory of the first data storage device containing one or more media files found during the scan of the first data storage device to an upload directory list. The instructions further cause the computer system to scan a second data storage device connected to the computer system for media files, add a directory of the second data storage device containing one or more media files found during the scan of the second data storage device to the upload directory list, and, for each directory in the upload directory list, determine respective identifiers for the one or more media files contained in the directory. The instructions further cause the computer system to send the determined identifiers to a server, receive confirmation from the server of whether the sent identifiers match identifiers for media files already stored by the server, and upload, to the server, one or more media files having identifiers confirmed as not matching identifiers for media files already stored by the server.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

According to various aspects of the subject technology, a system is configured to scan a user's hard drive to look for media files, which may be photos, videos, images, animated gifs, etc. When a directory on the user's hard drive containing media files meeting criteria is found, the directory is added to an upload directory list. The system maintains the upload directory list to later upload the media files of each directory in the upload directory list to a target location, such as a cloud storage system, remote directory, or other central hard drive.

Figure 1:
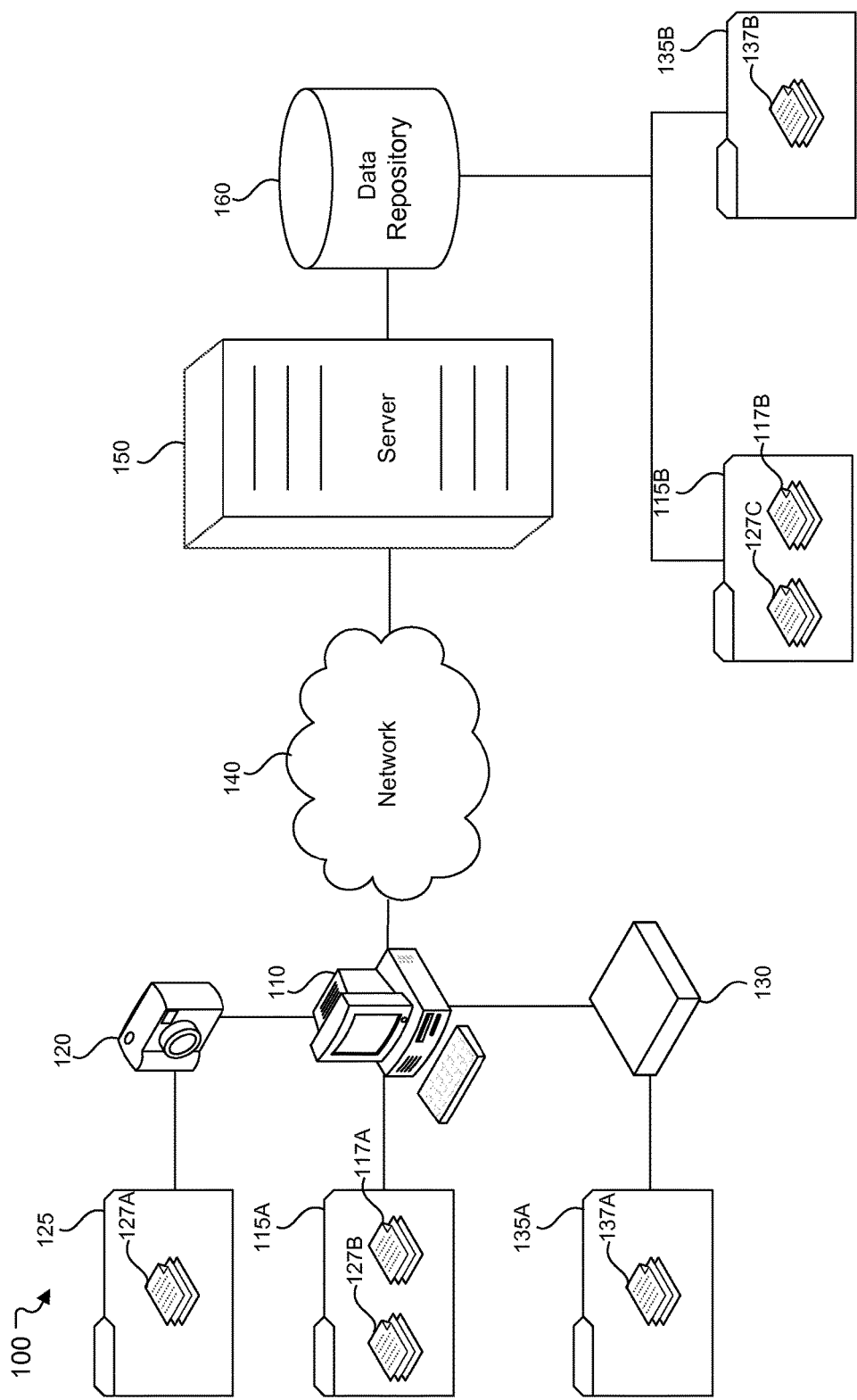
FIG. 1 illustrates a network environment according to example aspects of the present disclosure.

FIG. 1 illustrates an example network environment 100 including a computer 110, a camera 120, an external storage device 130, a network 140, a server 150, and a data repository 160. The computer 110 includes a directory 115A containing media files 117A. The camera 120 and the external storage device 130 can be connected to the computer 110. The camera 120 includes a directory 125 containing media files 127A. The external storage device 130, which may be an external hard drive, networked storage device, or other similar device, includes a directory 135A containing media files 137A. The computer 110 communicates with the server 150 through the network 140. The server 150 includes or is connected to the data repository 160. The server 150 and the data repository 160 may be a cloud storage system.

A user may store media files, such as photos and/or videos taken with the camera 120, in one directory, such as the directory 115A, or spread across multiple directories in a hard drive of the computer 110. According to example aspects, a system is configured to scan the hard drive of the computer 110 to find and identify directories containing media files, which may be candidates for uploading. The scanning may be a tree traversal starting from a root directory on the hard drive. The scanning may be a background operation that runs while the user uses the computing device for other operations. To reduce interference with the user's use of the computer 110, the scanning may be throttled.

The system may identify media files through, for example, filename extensions or metadata associated with the media files. When a directory having at least one media file is found, the system may tag, save in a list, or otherwise note the directory as having media files. In FIG. 1, the directory 115A is identified as having media files 117A.

Once the system identifies a directory having media files, the system examines the media files to determine if they are media files that the user may wish to upload to a cloud storage system, such as the server 150 and/or the data repository 160. Even if a directory contains media files, the user may not wish to upload all media files, such as media files downloaded from the internet. The system maintains an upload directory list of directories containing media files the user may wish to upload.

The system may use various heuristics to determine whether the media files correspond to user generated content and the associated directory should be added to the upload directory list. For example, the system may examine a directory containing numerous image files. Photos taken with digital cameras are generally saved with Exif metadata. If the image files do not include any Exif metadata, the directory may not contain user photos but may instead contain a browser cache of image files, which the user may not wish to upload. Other heuristics may also be used. For instance, a filesize or image resolution size may be analyzed. If the filesize or resolution size is below a filesize or resolution threshold, respectively, the media file may be a thumbnail or preview file, rather than user generated content. Statistical analysis may be performed on properties of the media files. For example, creation timestamps can be analyzed to determine user generated content. The media files may not be user generated content if they were created at the same time. Alternatively, the user may designate certain blackout times in which media created during the blackout times would be ignored. Other blacklists may be used. For example, system directories, other predetermined directories, or user pre-designated directories may be ignored. The user may also pre-designate specific directories to include.

If the system determines that the media files in a directory correspond to user generated content, the system designates the directory as an upload directory, such as by tagging it or saving it to the upload directory list. The system may present a user interface allowing the user to explore and manually change the upload directory list by adding or removing directories. In FIG. 1, the directory 115A contains media files 117A which are user generated, thus the directory 115A is added to the upload directory list.

After the upload directories are designated, the media files from the upload directories may be uploaded to the cloud storage system. Non-media files in the upload directories may be ignored. To ensure that the media files to be uploaded have not been previously uploaded, the system may determine an identifier for each media file for comparison to identifiers of previously uploaded media files. For instance, the system may apply a hash algorithm, such as a secure hash algorithm (SHA), to each media file in an upload directory. The system sends the respective hash digests to the cloud storage system. The cloud storage system may determine if the media file has already been uploaded by comparing the digest with a list or table of digests of already uploaded media files. If there is no matching digest, the media file may presumably be new and subsequently uploaded to the cloud storage system. The cloud storage system may send confirmation to the system that the digests do not match. As seen in FIG. 1, the media files 117A have been uploaded to the data repository 160 as media files 117B, which may be stored in a directory 115B. Alternatively, the identifier may be based on filename and/or other metadata, such as timestamp.

The user may also connect a peripheral device, such as the external storage device 130 or the camera 120, into the computer 110. Depending on the type of peripheral device, the directories of the peripheral device may be scanned and designated for upload, as described above, or the media files may be copied to an upload directory or other designated directory of the computer 110. The peripheral device may be an external hard drive or data storage device for archiving files, which may be determined based on storage capacity or device identifier. For example, if the peripheral device is the external storage device 130, the directories of the external storage device 130 are scanned and analyzed similar to the directories of the computer 110. In FIG. 1, the media files 137A are determined to be upload candidate media files, and the directory 135A is added to the upload directory list. As further seen in FIG. 1, the media files 137A have been uploaded to the data repository 160 as media files 137B in a directory 135B which may correspond to the directory 135A.

The peripheral device may be a camera, smartphone, etc. or a removable storage device (e.g., a media card, or data storage device not identified as an external hard drive). If the peripheral device is the camera 120, the media files may be first copied or moved to an upload directory on the computing device. To prevent copying media files already on the computer, the system may analyze the media files on a memory of the peripheral device. For example, the filenames of the media files on the peripheral device may be compared to the filenames of the media files on the computer. In addition, the hash digests of the media files on the peripheral device may be compared to the hash digests of the media files on the computer to prevent duplication. After copying the media files from the peripheral device, the media files on the peripheral device may be deleted to free space on the peripheral device. In FIG. 1, the media files 127A are determined to be upload candidate media files. The media files 127A have been copied to the directory 115A of the computer 110 as media files 127B. The media files 127B have been uploaded to the data repository 160 as media files 127C in the directory 115B. Although FIG. 1 shows the directory structure of the data repository 160 as mirroring the directory structure of the computer 110, in other implementations the directory structure may vary.

Figure 2:
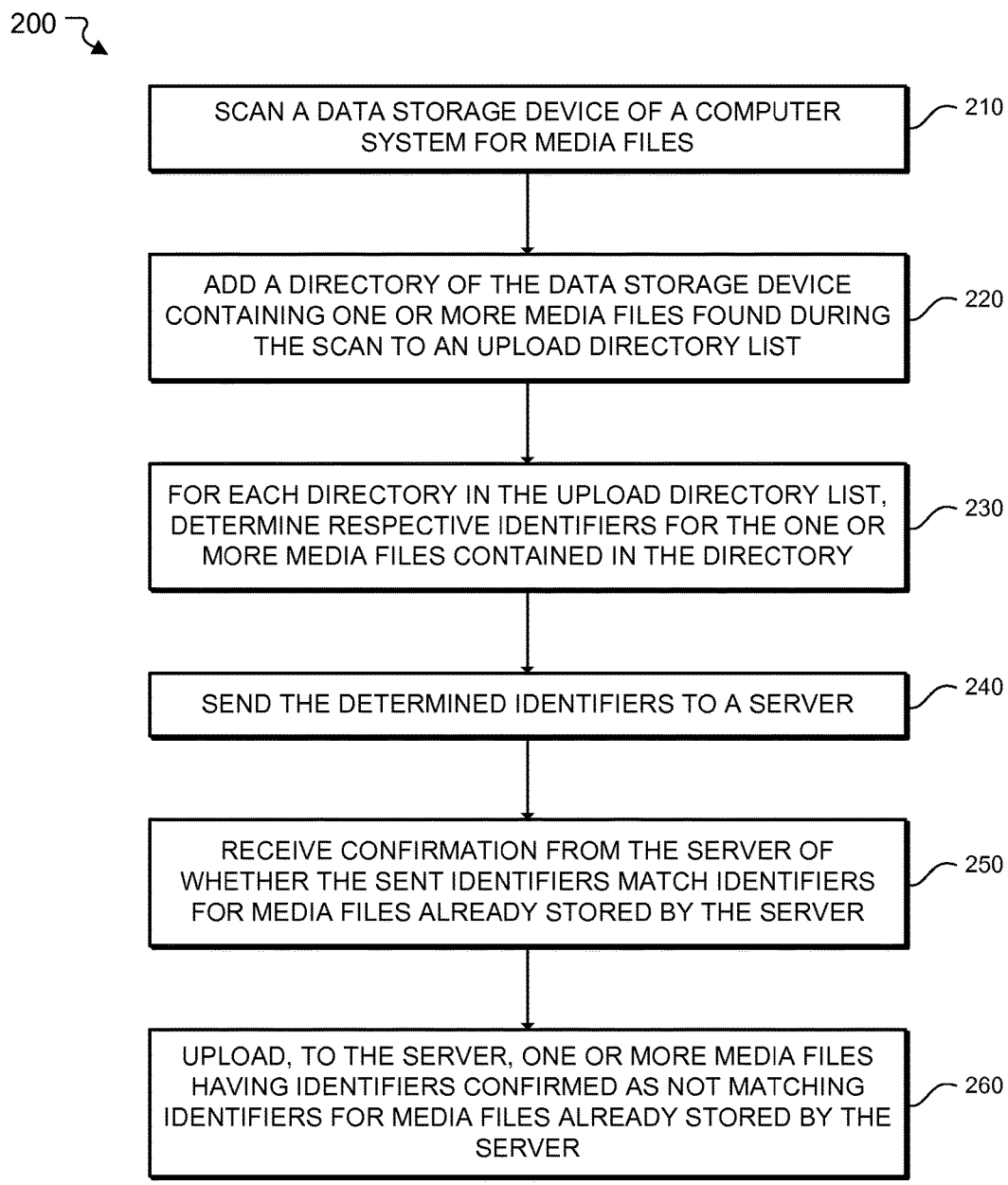
FIG. 2 shows a flowchart of a process for archiving media files according to example aspects of the present disclosure.

FIG. 2 shows a flowchart 200 of a process for automated archiving of user generated content according to example aspects. At block 210, a data storage device of a computer system, such as the computer 110, is scanned for media files. The scanning operation may be initiated when software for the automated archiving is first installed and executed. The scanning operation also may be initiated by the user, or may be automatically initiated by the computer system. For example, the computer system may be configured to start the scanning operation periodically, such as every 90 or 60 days, or in response to triggers, such as the detection of a peripheral device. The scanning operation may start at a root directory, and examine every directory through tree traversal. The files of each directory may be examined to determine if they are user generated media files. Media files may be analyzed with heuristics to determine whether the media files correspond to user generated content. For example, files with known media file extensions, such as .jpg, .mp4, etc. may be identified as media files. In addition, files with metadata, such as Exif metadata, corresponding to user generated media files may be identified as media files. In addition, other heuristics may be applied, including deterministic heuristics, such as filesize analysis, nondeterministic heuristics, such as user-defined rules, and/or statistical heuristics, such as examining file creation/modification timestamps. Negative heuristics may also be applied, for example to exclude directories containing common or popular images from the internet, which may be determined, for instance, from the directory name matching a known cache directory name or hierarchy. The user may also have the option to add additional filters or to manually include or exclude directories.

The scanning operation may be a background process. The scanning operation may be resource intensive, causing the computer system to slow down. The scanning operation may be throttled to mitigate performance degradation as experienced by the user. For example, the system may request a test random read operation during the tree traversal, which may have an expected time to complete. By comparing the actual time to complete the random read operation with the expected time, the computer system may determine a read delay or latency. Based on the latency, the computer system may throttle the scan operation. The latency may be caused by the traversal, and the traversal may be slowed. If there is no latency detected, the computer system may continue the traversal at the same speed, or may increase the speed. As such, the scanning may be dynamically adjusted. The throttling check may occur periodically, such as every 60 seconds, or may occur in response to a change in workload, such as another resource-intensive application running.

At block 220, a directory of the computer system containing one or more media files found during the scan is added to an upload directory list. A directory may be added if it contains media files determined to be user generated content. The directory may contain only media files, or may contain a certain number of media files along with other files. For example, if at least 50% of the files in the directory are media files, the directory may be added. In other implementations, a ratio of media files to non-media files may be compared to other threshold percentages, such as 25% media files, to determine whether to add the directory to the upload directory list. The non-media files in the added directory may be ignored, or alternatively treated as media files.

At block 230, respective identifiers for the media files contained in a directory are determined for each directory in the upload directory list. The identifier may be calculated by applying a hash algorithm, such as a secure hash algorithm (SHA), to the media file to generate a digest. In other implementations, other identifiers, such as filename or other metadata, may be used. The media files may be queued temporally, such that the most recently created or modified files may be hashed first. Older files may be more likely to have been previously uploaded. In addition, a timestamp of the previous upload may be saved. Media files created or modified before the previous upload may have already been analyzed and/or uploaded. In other words, identifiers may be generated only for media files created/modified after the previous upload timestamp.

At block 240, the determined identifiers are sent to a server, such as the server 150. The server may be the destination for the files to be uploaded. Alternatively, the server may manage files sent to a data repository. In certain implementations, the server may be implemented with the computer system.

At block 250, confirmation is received from the server of whether the sent identifiers match identifiers for media files already stored by the server. The confirmation may be based on a comparison, such as if the digests match digests of files already stored by the server. For example, the server may have a directory or other data repository corresponding to the user, and containing the user's previously uploaded media files. The server may also maintain identifiers for the user's previously uploaded media files, or may generate the identifiers as needed. The server may then compare the identifiers to determine matches. A match indicates that the corresponding media file has already been uploaded, or that it is not to be uploaded. In addition, the server may store or have access to identifiers for common images that may be available on the internet. The server may also determine whether the identifiers match identifiers for common images. The server may notify the computer system that the identifiers correspond to common images. The computer system may then remove directories containing common images from the upload directory list.

At block 260, the one or more media files having identifiers confirmed as not matching identifiers for media files already stored by the server are uploaded to the server. The server may store the uploaded files, or may send them to another data repository, such as the data repository 160 for archival.

Figure 3:
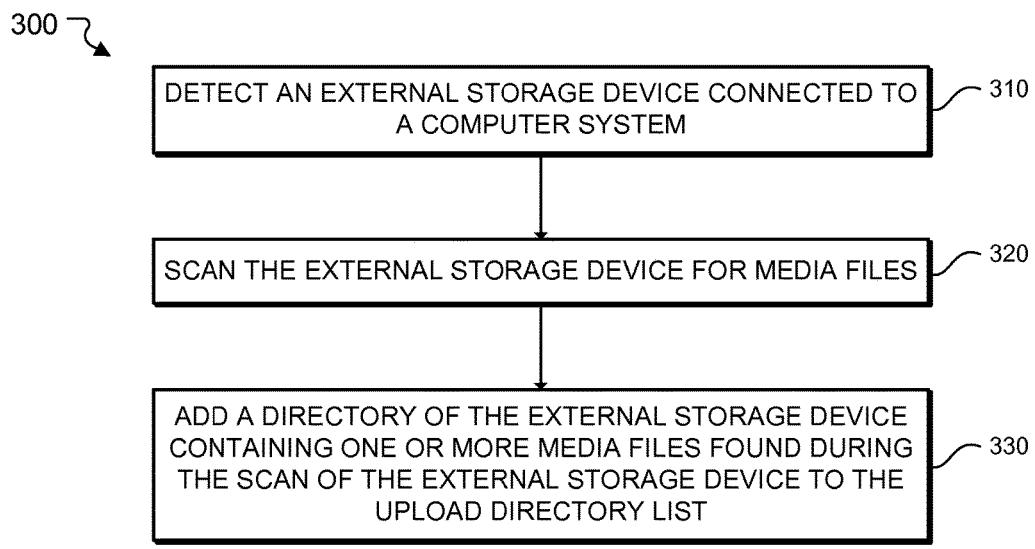
FIG. 3 shows a flowchart of a process for archiving media files from an external storage device according to example aspects of the present disclosure.

FIG. 3 shows a flowchart 300 of a process for archiving media files from an external storage device. At block 310, an external storage device, such as the external storage device 130, connected to the computer system is detected by the computer system, for example by an operating system of the computer system. The operating system may receive a signal from a port when the peripheral device is connected. The operating system may set a flag for the auto archival software to check. Alternatively, the operating system may initiate the auto archival software in response to the detecting the peripheral device. The operating system may identify a type of peripheral device and may alert or initiate the auto archival software. In other implementations, the connection of the peripheral device may change a file directory structure of the computer system, which the auto archival software may associate with a connected peripheral device.

At block 320, the external storage device is scanned for media files. The scanning may be similar to the scanning operation described herein for scanning the computer system. At block 330, a directory of the external storage device containing one or more media files found during the scan of the external storage device is added to the upload directory list. For example, the directories of the external storage device are added to the upload directory list of the computer system. The one or more media files in the directories of the external storage device may be uploaded along with the media files from directories of the computer system, as described herein.

Figure 4:
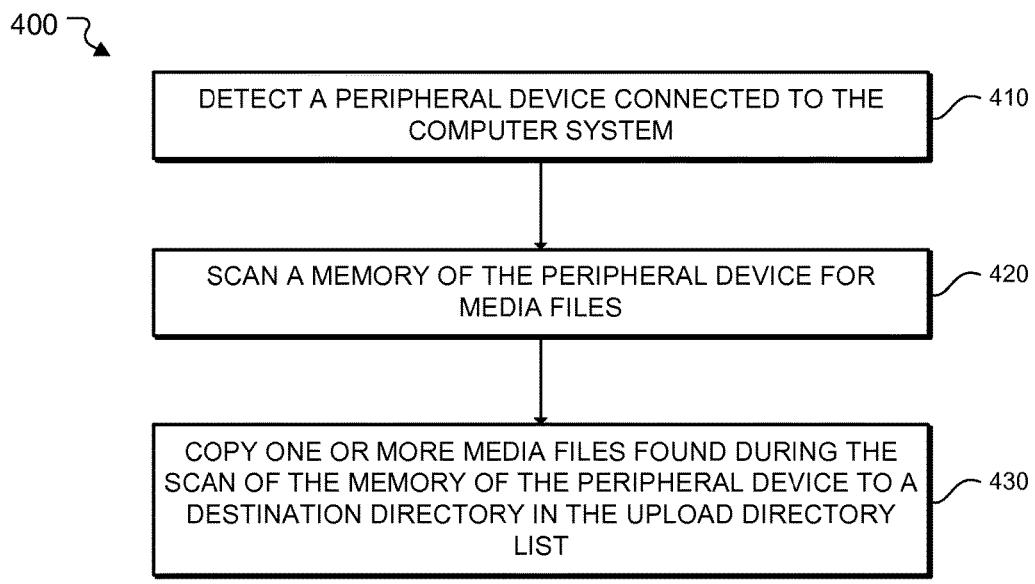
FIG. 4 shows a flowchart of a process for archiving media files from a peripheral device according to example aspects of the present disclosure.

FIG. 4 shows a flowchart 400 of a process for archiving media files from a peripheral device, such as camera 120. At block 410, a peripheral device connected to the computer system is detected. The peripheral device may be detected when it is connected to the computer system. Alternatively, the peripheral device may be detected during the scanning operation on the computer system.

At block 420, a memory of the peripheral device is scanned. The memory may be, for example, a flash storage of the peripheral device. The scanning may be similar to the scanning operation described with respect to FIG. 2. At block 430, the one or more media files found during the scan of the memory of the peripheral device are copied to a destination directory. The destination directory may be a directory in the upload directory list. The destination directory may be on the computer system or an external storage device connected to the computer system. The peripheral device may not be connected to the computer system during the upload operation. By copying the media files to the destination directory, the media files from the peripheral device may be later archived. In certain implementations, the media files may be deleted from the memory of the peripheral device after copying to the destination directory. The media files may always be deleted after being copied. Alternatively, the media files may be deleted when free space on the memory of the peripheral device is low, such as below 10% or other free space threshold such as 5% or 15%.

Figure 5:
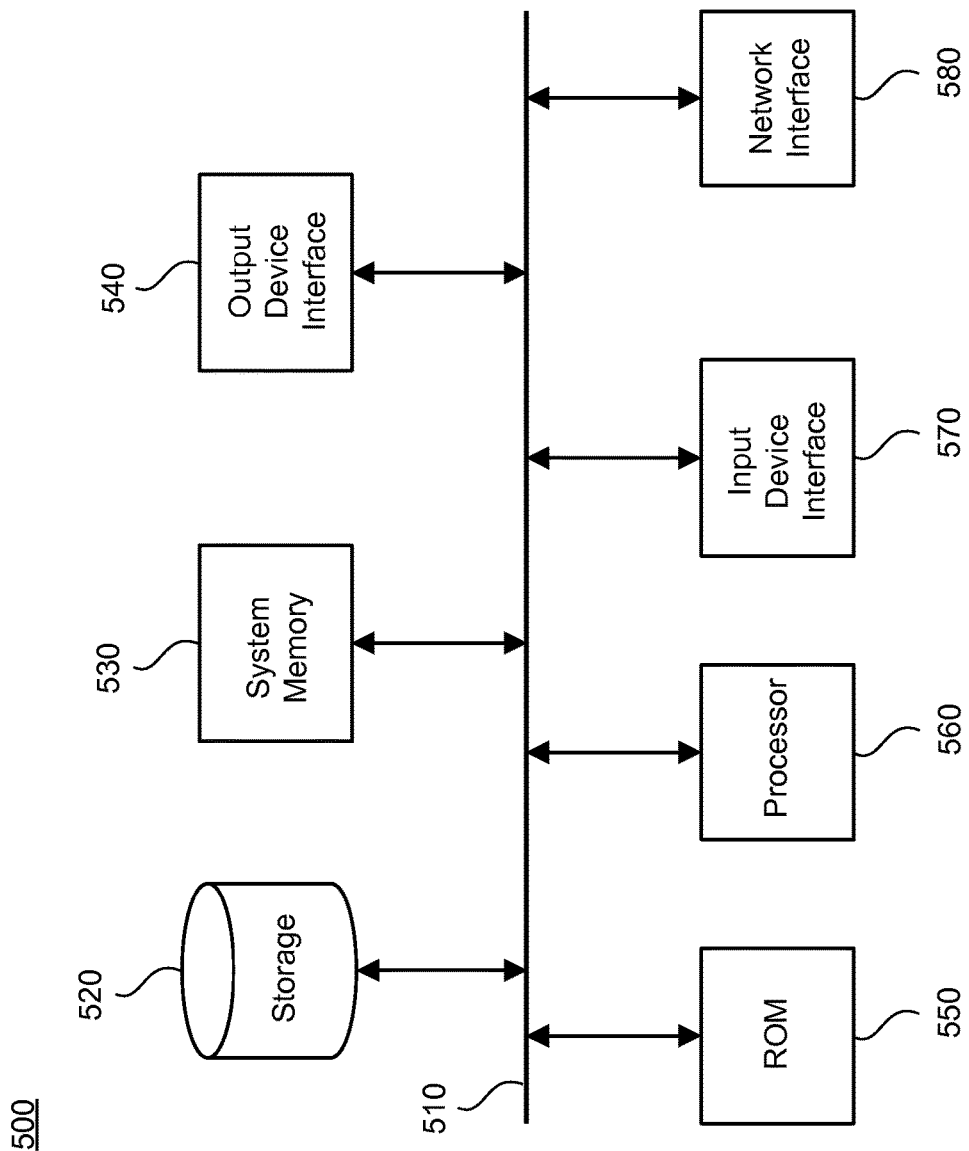
FIG. 5 shows a diagram of an electronic system according to example aspects of the present disclosure.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 510, processing unit(s) 560, a system memory 530, a read-only memory (ROM) 550, a permanent storage device 520, an input device interface 570, an output device interface 540, and a network interface 580.

Bus 510 collectively represents all system, peripheral, and chipset buses that communicatively connect the numerous internal devices of electronic system 500. For instance, bus 510 communicatively connects processing unit(s) 560 with ROM 550, system memory 530, and permanent storage device 520.

From these various memory units, processing unit(s) 560 retrieves instructions to execute and data to process in order to execute the processes of the subject disclosure. The processing unit(s) can be a single processor or a multi-core processor in different implementations.

ROM 550 stores static data and instructions that are needed by processing unit(s) 560 and other modules of the electronic system. Permanent storage device 520, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 520.

Other implementations use a removable storage device (for example, a floppy disk, flash drive, and its corresponding disk drive) as permanent storage device 520. Like permanent storage device 520, system memory 530 is a read-and-write memory device. However, unlike storage device 520, system memory 530 is a volatile read-and-write memory, such as a random access memory. System memory 530 stores some of the instructions and data that the processor needs at runtime. In some implementations, the processes of the subject disclosure are stored in system memory 530, permanent storage device 520, or ROM 550. For example, the various memory units include instructions for finding and uploading user generated media content. From these various memory units, processing unit(s) 560 retrieves instructions to execute and data to process in order to execute the processes of some implementations.

Bus 510 also connects to input and output device interfaces 570 and 540. Input device interface 570 enables the user to communicate information and select commands to the electronic system. Input devices used with input device interface 570 include, for example, alphanumeric keyboards and pointing devices (also called "cursor control devices"). Output device interfaces 540 enables, for example, the display of images generated by the electronic system 500. Output devices used with output device interface 540 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 510 also couples electronic system 500 to a network (not shown) through a network interface 580. In this manner, the computer can be a part of a network of computers (for example, a local area network (LAN), a wide area network (WAN), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A non-transitory, computer-readable storage medium containing instructions that cause a computer system executing the instructions to:
    scan a data storage device of the computer system for media files to be uploaded to a server;
    determine a ratio of media files to non-media files in the data storage device;
    add a directory of the data storage device containing a first set of media files found during the scan of the data storage device to an upload directory list in response to determining that the ratio of media files to non-media files is above a threshold percentage;
    determine a respective identifier for each media file in the first set of media files;
    send the determined identifiers to the server;
    receive confirmation from the server of whether the sent identifiers match identifiers for media files already stored by the server;
    upload, to the server using the upload directory list, one or more media files having identifiers confirmed as not matching the identifiers for media files already stored by the server; and
    delete the one or more media files after they are uploaded to the server using the upload directory list.

2. The non-transitory, computer-readable storage medium of claim 1, wherein the instructions further cause the computer system to:
    detect an external storage device connected to the computer system;
    scan the external storage device for media files; and
    add a directory of the external storage device containing a second set of media files found during the scan of the external storage device to the upload directory list.

3. The non-transitory, computer-readable storage medium of claim 1, wherein the instruction further cause the computer system to determine respective identifiers for the first set of media files contained in the directory and created after a previous upload timestamp.

4. The non-transitory, computer-readable storage medium of claim 1, wherein the instructions further cause the computer system to identify the first set of media files that include a user-generated content based on metadata.

5. The non-transitory, computer-readable storage medium of claim 4, wherein the instructions further cause the computer system to determine the metadata of the first set of media files includes exchangeable image file format data.

6. The non-transitory, computer-readable storage medium of claim 4, wherein the instructions further cause the computer system to analyze a number of files having Exchangeable image file format data in the directory.

7. The non-transitory, computer-readable storage medium of claim 1, wherein the instructions further cause the computer system to analyze a respective resolution of the each media file in the first set of media files.

8. The non-transitory, computer-readable storage medium of claim 1, wherein the instructions further cause the computer system to:
    detect a read delay when scanning the data storage device; and
    throttle the scanning based on the read delay.

9. The non-transitory, computer-readable storage medium of claim 1, wherein the instructions to determine the respective identifier for each media file in the first set of media files further cause the computer system to apply a hash function to the first set of media files to generate respective digests.

10. The non-transitory, computer-readable storage medium of claim 1, wherein adding the directory of the data storage device to the upload directory list comprises adding the directory of the data storage device containing a ratio of media files to non-media files above a threshold percentage.

11. The non-transitory, computer-readable storage medium of claim 1, wherein the instructions further cause the computer system to:
    detect a peripheral device connected to the computer system;
    scan a memory of the peripheral device for media files; and
    copy a third set of media files found during the scan of the memory of the peripheral device to a destination directory in the upload directory list.

12. The non-transitory, computer-readable storage medium of claim 11, wherein the instructions further cause the computer system to:
    determine respective identifiers for the third set of media files found on the memory of the peripheral device; and
    compare the determined identifiers for the third set of media files found on the peripheral device to identifiers of the first set of media files stored on the data storage device of the computer system,
    wherein the third set of media files are copied to the destination directory if the determined identifiers for the third set of media files on the peripheral device do not match the identifiers of the first set of media files already stored on the data storage device of the computer system.

13. The non-transitory, computer-readable storage medium of claim 12, wherein the respective identifiers for the third set of media files found on the peripheral device comprises respective filenames for the third set of media files found on the peripheral device.

14. The non-transitory, computer-readable storage medium of claim 11, wherein the instructions further cause the computer system to delete the third set of media files from the peripheral device after the third set of media files have been copied to the destination directory.

15. A system comprising:
one or more processors;
a data storage device; and
a non-transitory, computer-readable storage medium comprising instructions stored therein, which when executed by the one or more processors, cause the one or more processors to perform operations comprising:
scanning the data storage device for media files to be uploaded to a server;
determining a ratio of media files to non-media files in the data storage device;
adding a directory of the data storage device containing a first set of media files found during the scan of the data storage device to an upload directory list in response to determining that the ratio of media files to non-media files is above a threshold percentage;
determining a respective identifier for each media file in the first set of media files;
sending the determined identifiers to the server;
receiving confirmation from the server of whether the sent identifiers match identifiers for media files already stored by the server;
uploading, to the server using the upload directory list, one or more media files having identifiers confirmed as not matching the identifiers for media files already stored by the server;
deleting the one or more media files after they are uploaded to the server using the upload directory list.

16. The system of claim 15, wherein the operations further comprise:
detecting an external storage device connected to the system;
scanning the external storage device for media files; and
adding a directory of the external storage device containing a second set of media files found during the scan of the external storage device to the upload directory list.

17. The system of claim 15, wherein the operations further comprise:
detecting a peripheral device connected to the system;
scanning a memory of the peripheral device for media files; and
copying a third set of media files found during the scan of the memory of the peripheral device to a destination directory in the upload directory list.

18. The system of claim 17, wherein the operations further comprise:

determining respective identifiers for the third set of media files found on the memory of the peripheral device; and
comparing the determined identifiers for the third set of media files found on the peripheral device to identifiers of media files stored on the data storage device,
wherein the third set of media files are copied to the destination directory if the determined identifiers for the third set of media files on the peripheral device do not match the identifiers of the first set of media files already stored on the data storage device.

19. A non-transitory, computer-readable storage medium containing instructions that cause a computer system executing the instructions to:
scan a first data storage device of the computer system for media files to be uploaded to a server;
determine a ratio of media files to non-media files in the data storage device;
add a directory of the first data storage device containing a first set of media files found during the scan of the first data storage device to an upload directory list in response to determining that the ratio of media files to non-media files is above a threshold percentage;
scan a second data storage device connected to the computer system for media files;
add a directory of the data storage device containing a second set of media files found during the scan of the second data storage device to an upload directory list;
determine a respective identifier for each media file in the first set of media files and the second set of media files;
send the determined identifiers to the server;
receive confirmation from the server of whether the sent identifiers match identifiers for media files already stored by the server;
upload, to the server using the upload directory list, one or more media files having identifiers confirmed as not matching identifiers for media files already stored by the server; and
delete the one or more media files after they are uploaded to the server using the upload directory list.

20. The non-transitory, computer-readable storage medium of claim 19, wherein the instructions further cause the computer system to:
detect a peripheral device connected to the computer system;
scan a memory of the peripheral device for media files;
copy a third set of media files found during the scan of the memory of the peripheral device to a destination directory in the upload directory list; and
compare the determined identifiers for the third set of media files found on the peripheral device to identifiers of media files stored on the data storage device of the computer system, wherein the third set of files are copied to the destination directory if the determined identifiers for the third set of media files on the peripheral device do not match the identifiers of the first set of media files already stored on the data storage device of the computer system.

* * * * *